United States Patent
Parkman et al.

[15] 3,670,149
[45] June 13, 1972

[54] AUTOMATIC FLIGHT CONTROL SYSTEMS

[72] Inventors: William Terence Parkman; James Kenneth Maxwell MacCormac, both of London, England

[73] Assignee: Elliott Brothers (London) Limited, London, England

[22] Filed: Jan. 28, 1970

[21] Appl. No.: 6,371

[30] Foreign Application Priority Data

Jan. 29, 1969 Great Britain..........................5,069/69

[52] U.S. Cl......................235/150.22, 244/77 A, 343/108 R
[51] Int. Cl. ......................................G06g 7/78, B64c 13/50
[58] Field of Search...................235/150.22; 244/77 R, 77 A; 343/108 R

[56] References Cited

UNITED STATES PATENTS 3,489,378  1/1970  Watson et al. ......................343/108 X

*Primary Examiner*—Malcolm A. Morrison
*Assistant Examiner*—R. Stephen Dildine, Jr.
*Attorney*—Misegades & Douglas

[57] ABSTRACT

The specification discloses an aircraft control apparatus for supplying a "flare-out phase" pitch demand signal for an aircraft automatic pilot of such a character as to render the autopilot less dependent on the values of the aircraft flight system constants which are subject to variation from aircraft to aircraft as a result of tolerances in manufacture. The control apparatus develops an electrical pitch demand signal represented by:-

$$\eta_{d_{flare}} = \left[ K_1(h + K_2 \dot{h}) \cdot \left(1 + \frac{1}{T_1 s(1+T_2 s)}\right) + \frac{K_3 s \theta}{1+T_3 s} \right]$$

where
$\theta$ is the aircraft pitch angle,
$h$ is the aircraft altitude,
$\dot{h}$ is the rate of aircraft vertical descent,
$s$ is the Laplace operator,
$K_1, K_2, K_3$ are flight systems constants of the aircraft,
$T_1, T_2, T_3$ are time constants of the aircraft flight system. Optionally, a signal component dependent upon changes from a predetermined value in the aircraft airspeed may be added into the pitch demand signal $\eta_{d_{flare}}$

4 Claims, 1 Drawing Figure

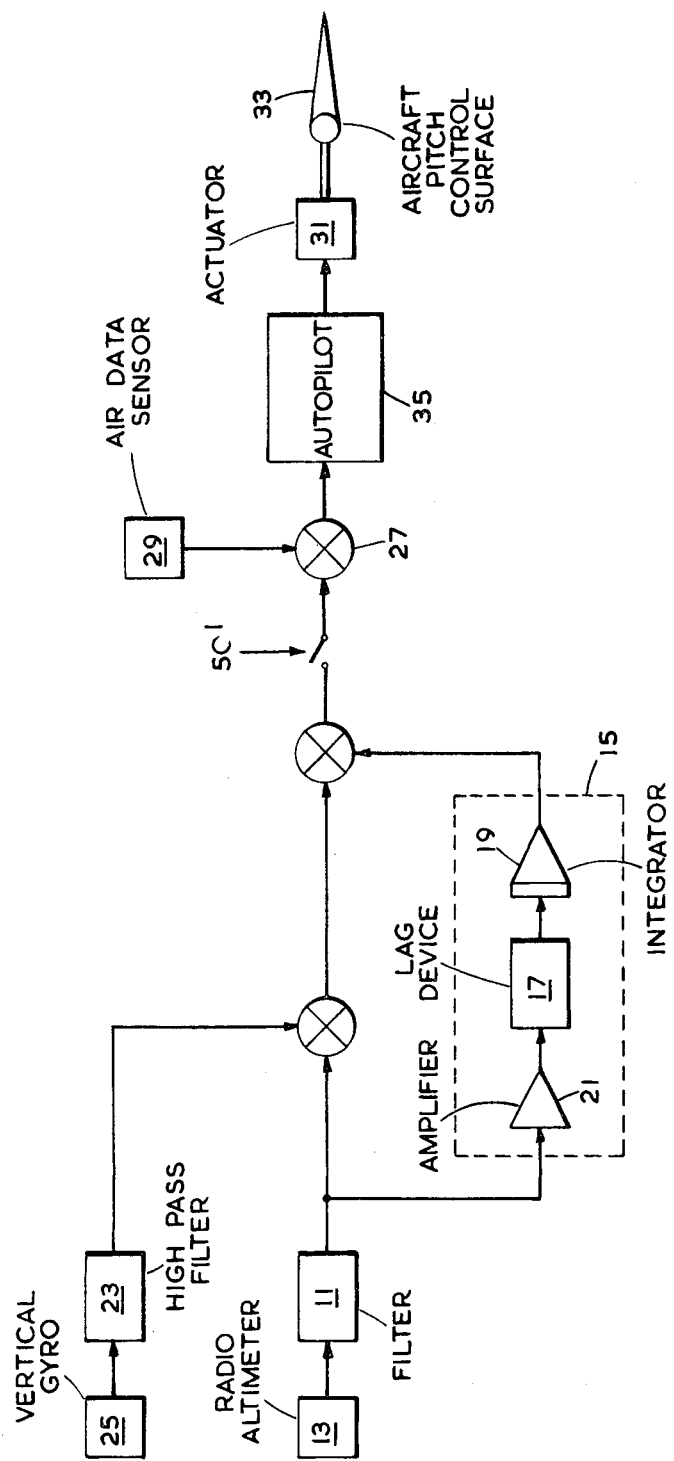

AUTOMATIC FLIGHT CONTROL SYSTEMS

This invention relates to automatic flight control systems for aircraft and is particularly concerned with the control of the aircraft during the flare-out phase of aircraft automatic landing procedures.

The problem is to establish a control law which ensures dynamic stability of the aircraft during the flare-out (or more simply — flare) maneuver and which yet gives, at touchdown, a vertical descent rate which is within an acceptable narrow range determined by the loads which the aircraft landing gear can safely withstand and, in addition, satisfies the distance to touchdown range requirement for the aircraft.

By the "distance to touchdown requirement" is meant the requirement that the actual touchdown position of an aircraft shall lie within a prescribed distance of a prescribed nominal touchdown position in the direction of the runway.

It is known, in aircraft landing procedures, to employ a pitch demand signal $$\eta_{d_{flare}} = \left[ K_1(h + K_2\dot{h}) \cdot \left(1 + \frac{1}{1+T_2s}\right) \right] + \frac{K_3 s\theta}{1+T_3s}$$

in controlling the aircraft in pitch during the aircraft landing flare maneuver. In the right hand member of the above equation, the terms $K_1$, $K_2$, $K_3$ are system constants, $h$ is aircraft altitude, $\dot{h}$ is rate of vertical descent, $T_2$ and $T_3$ are time constants, $\theta$ is aircraft pitch attitude and $s$ is the Laplace operator.

Because of differences, resulting from manufacturing tolerances, in the aerodynamic behavior of individual aircraft, it is found that, employing a flare law as set out above, adjustment of the gains and time constants of the system of each aircraft may be necessary in order to achieve a dynamically stable flare maneuver which results, at touchdown, in a prescribed vertical descent rate of the aircraft, at a touchdown position which lies within a prescribed range of the runway.

The present invention is for a method of controlling an aircraft in pitch during landing flare maneuvers in which the pitch control surface or surfaces of the aircraft are, during flare, controlled in accordance with a pitch demand signal $$\eta_{d_{flare}}$$

which has signal components:

$$\left[ K_1(h + K_2\dot{h}) \cdot \left(1 + \frac{1}{T_1s(1+T_2s)}\right) \right] \text{ and } \frac{K_3 s\theta}{1+T_3s}$$

The terms $K_1$, $K_2$, $K_3$, $h$, $\dot{h}$, $T_2$, $\theta$ and $s$ have the meanings previously assigned to them; and $T_1$ is a further time constant. The pitch demand signal $$\eta_{d_{flare}}$$

may also include a further signal component $K_4 \Delta V$. The term $K_4$ is a system constant; the term $\Delta V$ represents change in aircraft airspeed from a predetermined value.

According to another aspect of the invention an automatic flight control system for controlling an aircraft in pitch during landing flare maneuvers comprises a sensor operable to develop a signal $h$ representing aircraft altitude, a sensor operable to develop a signal $\theta$ representing aircraft pitch attitude, and computing means operative in response to the signals from the aforementioned sensors so as to develop a pitch demand signal $$\eta_{d_{flare}}$$

which has signal components $$\left[ K_1(h + K_2\dot{h}) \cdot \left(1 + \frac{1}{T_1s(1+T_2s)}\right) \right] \text{ and } \frac{K_3 s\theta}{1+T_3s}$$

The system may also include an air data sensor operable to develop a signal $\Delta V$ representing change in airspeed of the aircraft from a predetermined value; and the pitch demand signal developed by the computing means may have a further input signal component $K_4 \Delta V$.

Using the method and system according to the invention it is found that stable flare maneuvers resulting in a desired descent rate at touchdown within a specified range of the runway can be readily achieved without adjustment of the various gains and time constants to suit the differing aerodynamic characteristics of individual aircraft.

An embodiment of the invention is hereinafter described with reference to the accompanying block schematic diagram of that portion, the 'autoflare' computer, of an aircraft automatic flight control system which is specifically employed in controlling the aircraft in flare-out.

The computer includes first filter circuitry 11 which receives, from a radio altimeter 13 carried by the aircraft, an altitude signal $h$ and develops a signal $K_1(h + K_1\dot{h})$; second filter circuitry 15 which receives the output signal from the first filter circuitry 11 and operates on the latter signal in accordance with the transformation $$\left(1 + \frac{1}{T_1s(1+T_2s)}\right)$$

The latter transformation is effected by a lag device 17, an integrator 19 and an amplifier 21.

To the signal developed by the filter circuitry 11 is added a signal $(K_3 s\theta)/(1+T_3s)$ developed by a washout, i.e. high pass filter, circuit 23 in response to a signal $\theta$ derived from a vertical gyro 25 carried by the aircraft. The resultant of this addition is added to the output signal from the filter 15.

The composite signal represented by the terms $$\left[ K_1(h + K_2\dot{h}) \cdot \left(1 + \frac{1}{T_1s(1+T_2s)}\right) \right] + \frac{K_3 s\theta}{1+T_3s}$$

is not switched into the pitch channel so as to control the pitch control surfaces of the aircraft until commencement of flare i.e. at 50 ft. altitude. At this time the composite signal is supplied to a summing point 27 which also receives a signal $K_4 \Delta V$ derived from an air data sensor 29. The final signal $$\eta_{d_{flare}}$$

is supplied to the pitch channel control circuitry of the aircraft autopilot 35.

The autopilot output is employed to control an actuator 31 which is coupled to the aircraft pitch control surfaces 33.

In the automatic flight control system for the V.C.10 aircraft it is found that with the following values assigned to the various factors of the above expression an overall touchdown vertical descent rate close to the design aim of 2 ft. per second is achieved:

$K_1 = 0.32$, $K_2 = 5$, $K_3 = 3.4$, $K_4 = 0.75$, $T_1 = 5$, $T_2 = 1.1$, and $T_3 = 1$.

These values will, of course, differ from one type of aircraft to another. It can be stated, however, that with the expression for $$\eta_{d_{flare}}$$

given it is, at least so far as conventional present day aircraft are concerned, possible to select values such that aircraft vertical descent rate $\dot{h}$, at touchdown, is within a prescribed range and that, with this constraint as to touchdown vertical speed, the aircraft yet possesses dynamic stability during the flare maneuver.

The term $K_4 \Delta V$ which forms part of the overall flare demand signal $$\eta_{d_{flare}}$$

may, it is thought, be dispensed with. This would of course require the modification of the values assigned to the system constants $K_1$ to $K_3$ and the time constants $T_1$ to $T_3$ of the other terms, in order to satisfy the requirements, given previously, as to dynamic stability, vertical descent rate at touchdown, and distance to touchdown range.

So too, the time constant $T_2$ may take zero value. As before the assigning of the value zero to the time constant $T_2$ would necessitate adjustment of the system constants $K_1$ to $K_4$ and the time constants $T_1$ and $T_3$.

While the described embodiment is for an analogue system an airborne digital computer may be employed in developing the signal $\eta_{d_{flare}}$ In the latter event the Laplace transformations realized by the lag device, integrator and washout circuits of the described embodiment would be performed, on the signals $\theta$ and $h$, using an appropriate computer program.

In determining the values to be assigned to the gains (system constants) and time constants of any proposed flare law the law is studied in relation to data describing the overall aircraft dynamics and the ground effects. In practice this is a computer-aided simulator study from which the control performance of the aircraft (i.e. the ability of the aircraft to perform a stable flare maneuver which ends in touchdown at an acceptable touchdown position with an acceptable vertical descent rate) for assumed values of the aforementioned gains and time constants can be ascertained. The gains and time constants are then adjusted in value so as, if necessary, to achieve and to optimize the control performance.

We claim:

1. Method for controlling an aircraft in pitch during landing flare maneuvers which comprises the steps of developing a signal $h$ representing aircraft altitude, developing a signal $\theta$ representing aircraft pitch altitude, and developing in response to said altitude and pitch altitude signals, a pitch demand signal $$\eta_{d_{flare}}$$

which has signal components:

$$k_1 \, (h+K_2\dot{h}) \cdot \left(1+\frac{1}{T_1 s(1+T_2 s)}\right) \text{ and } \frac{K_3 s\theta}{1+T_3 s}$$

added together, in which $K_1$, $K_2$ and $K_3$ are system constants, $h$ is aircraft altitude, $\dot{h}$ is rate of vertical descent, $T_1$, $T_2$ and $T_3$ are time constants, $\theta$ is aircraft pitch altitude and $s$ is the Laplace operator, and controlling the pitch control surface or surfaces of the aircraft, during flare, in accordance with the pitch demand signal.

2. Method according to claim 1, further comprising the step of adding to the signal $$\eta_{d_{flare}}$$

a further signal component $K_4 \Delta V$, in which $K_4$ is a system constant and $\Delta V$ represents change in aircraft airspeed from a predetermined value.

3. An automatic flight control system for controlling an aircraft in pitch during landing flare maneuvers which comprises a sensor operable to develop a signal $h$ representing aircraft altitude, a sensor operable to develop a signal $\theta$ representing aircraft pitch attitude, and computing means operative in response to the signals from the aforementioned sensors so as to develop a pitch demand signal $$\eta_{d_{flare}}$$

which has signal components:

$$\left[K_1(h+K_2\dot{h}) \cdot \left(1+\frac{1}{T_1 s(1+T_2 s)}\right)\right] \text{ and } \frac{K_3 s\theta}{1+T_3 s}$$

added together, in which $K_1$, $K_2$ and $K_3$ are system constants, $h$ is aircraft altitude, $\dot{h}$ is rate of vertical descent, $T_1$, $T_2$, and $T_3$ are time constants, $\theta$ is aircraft pitch attitude and $s$ is the Laplace transform.

4. A system according to claim 3 which further comprises an air data sensor operable to develop a signal $\Delta V$ representing change in airspeed of the aircraft from a prescribed value and in which the pitch demand signal $$\eta_{d_{flare}}$$

developed by the computing means has a further signal component $K_4 \Delta V$, where $K_4$ is a constant.

* * * * *